(12) United States Patent
Kim et al.

(10) Patent No.: US 12,185,072 B2
(45) Date of Patent: Dec. 31, 2024

(54) METHOD AND DEVICE FOR RECORDING SOUND OF ELECTRONIC DEVICE USING EARPHONES

(71) Applicant: SAMSUNG ELECTRONICS CO., LTD., Suwon-si (KR)

(72) Inventors: Heejin Kim, Suwon-si (KR); Kyungsam Min, Suwon-si (KR); Chahee Park, Suwon-si (KR); Hyunyoung Yang, Suwon-si (KR); Myoungwoo Nam, Suwon-si (KR); Inje Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 17/940,530

(22) Filed: Sep. 8, 2022

(65) Prior Publication Data
US 2023/0140204 A1   May 4, 2023

Related U.S. Application Data

(63) Continuation of application No. PCT/KR2022/011965, filed on Aug. 11, 2022.

(30) Foreign Application Priority Data

Nov. 3, 2021  (KR) .................. 10-2021-0149669
Jan. 4, 2022  (KR) .................. 10-2022-0001011

(51) Int. Cl.
*H04R 5/04* (2006.01)
*H04R 5/033* (2006.01)

(52) U.S. Cl.
CPC .............. *H04R 5/04* (2013.01); *H04R 5/033* (2013.01); *H04R 2460/07* (2013.01)

(58) Field of Classification Search
CPC ...... H04R 5/04; H04R 5/033; H04R 2460/07; H04R 1/10; H04R 3/00; H04R 5/027;
(Continued)

(56) References Cited

U.S. PATENT DOCUMENTS 8,284,951 B2 * 10/2012  Van Schaack ......... H04R 5/033
                                                381/26
8,831,242 B2 *  9/2014  Brown ..................... H03G 3/20
                                                381/74
(Continued)

FOREIGN PATENT DOCUMENTS

EP       2451188        5/2012
JP     2020-135725      8/2020
(Continued)

OTHER PUBLICATIONS

Search Report dated Nov. 11, 2022 issued in International Patent Application No. PCT/KR2022/011965.
(Continued)

*Primary Examiner* — Xu Mei
(74) *Attorney, Agent, or Firm* — NIXON & VANDERHYE P.C.

(57) ABSTRACT

According to an example embodiment, an electronic device may include: a communicator comprising communication circuitry configured to establish communication with a pair of earphones, and a processor configured to: determine whether each of the earphones is being worn and initiate recording of a sound input through a microphone of an earphone determined to be in a worn state among the earphones.

20 Claims, 14 Drawing Sheets

(58) Field of Classification Search
CPC .. H04R 1/1041; H04R 3/005; H04R 2420/07; G11B 20/10; G11B 27/34
USPC .................................. 381/74, 26; 455/575.2
See application file for complete search history.

(56) References Cited

U.S. PATENT DOCUMENTS

| | | | | |
|---|---|---|---|---|
| 9,967,647 | B2* | 5/2018 | Kumar | G10K 11/17885 |
| 10,067,734 | B2* | 9/2018 | Watson | G06F 3/162 |
| 10,419,853 | B2 | 9/2019 | Hariharan et al. | |
| 10,805,708 | B2* | 10/2020 | Mou | H04R 5/033 |
| 10,827,253 | B2* | 11/2020 | Boetcher | H04R 1/1083 |
| 11,134,354 | B1* | 9/2021 | Lesso | H04R 29/004 |
| 11,323,664 | B1* | 5/2022 | Jackson | H04N 23/51 |
| 11,366,633 | B2* | 6/2022 | O'Connor | H04R 1/1041 |
| 2002/0003889 | A1* | 1/2002 | Fischer | H04R 5/0335 |
| | | | | 381/370 |
| 2009/0154720 | A1* | 6/2009 | Oki | H04R 1/1041 |
| | | | | 381/74 |
| 2016/0192073 | A1* | 6/2016 | Poornachandran | H04S 7/40 |
| | | | | 381/26 |
| 2018/0152795 | A1* | 5/2018 | Lee | H04R 1/1041 |
| 2021/0329402 | A1 | 10/2021 | Laaksonen et al. | |

FOREIGN PATENT DOCUMENTS

| | | |
|---|---|---|
| KR | 10-2010-0065536 | 6/2010 |
| KR | 10-1319983 | 10/2013 |
| KR | 10-2014-0106776 | 9/2014 |
| KR | 10-2015-0028067 | 3/2015 |
| KR | 10-2015-0134972 | 12/2015 |
| KR | 10-2018-0062270 | 6/2018 |
| KR | 10-2011550 | 8/2019 |
| KR | 10-2127622 | 6/2020 |
| WO | 2020/118641 | 6/2020 |

OTHER PUBLICATIONS

Extended European Search Report for EP Application No. 22890137.7 dated Oct. 7, 2024, 7 pages.

* cited by examiner

METHOD AND DEVICE FOR RECORDING SOUND OF ELECTRONIC DEVICE USING EARPHONES

CROSS-REFERENCE TO RELATED APPLICATIONS

This application is a continuation of International Application No. PCT/KR2022/011965 designating the United States, filed on Aug. 11, 2022, at the Korean Intellectual Property Receiving Office and claiming priority to Korean Patent Application No. 10-2021-0149669, filed on Nov. 3, 2021, in the Korean Intellectual Property Office, and to Korean Patent Application No. 10-2022-0001011, filed on Jan. 4, 2022, in the Korean Intellectual Property Office, the disclosures of all of which are incorporated by reference herein in their entireties.

BACKGROUND

1. Field

The disclosure relates to an electronic device for performing a sound recording function using earphones and an operating method of the electronic device.

2. Description of Related Art

Electronic devices may not only place calls but also record sounds and videos. An electronic device may receive sounds using a microphone of the electronic device, transform the received sounds into sound signals through the microphone, and record the sound signals. The electronic device may also record sounds using earphones connected to the device. For example, the electronic device may record sounds input through microphones provided in a pair of earphones (right and left earphones) to offer a more realistic sound similar to the sound heard directly through the ears. Conventionally, electronic devices may record sounds input through a pair of earphones. However, there is a problem that a user has to manually select the right or left earphone as the desired microphone path.

SUMMARY

Embodiments of the disclosure provide an electronic device that may sense a change in a state of an earphone and determine whether to use a sound input through a microphone of the earphone for recording according to the changed state.

Embodiments of the disclosure provide electronic device that may perform binaural recording in response to a determination that both of a pair of earphones are in a worn state, perform mono recording in response to a determination that one earphone is in the worn state, and perform micro recording in response to a determination that both of the pair of earphones are in an unworn state.

Embodiments of the disclosure provide electronic device that may display, on a display, a device used for the recording for each time point at which recording is performed and display, on the display, the device used for the recording for each time point at which a recorded file is played.

According to an example embodiment, an electronic device may include: a communicator comprising communication circuitry configured to establish communication with a pair of earphones; and a processor configured to: determine whether each of the earphones is being worn and initiate recording of sound input through a microphone of an earphone of the pair of earphones determined to be in a worn state.

According to an example embodiment, a method performed by an electronic device may include: establishing communication with a pair of earphones, determining whether each of the earphones is being worn, and initiating recording of a sound input through a microphone of an earphone of the pair of earphones determined to be in a worn state.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
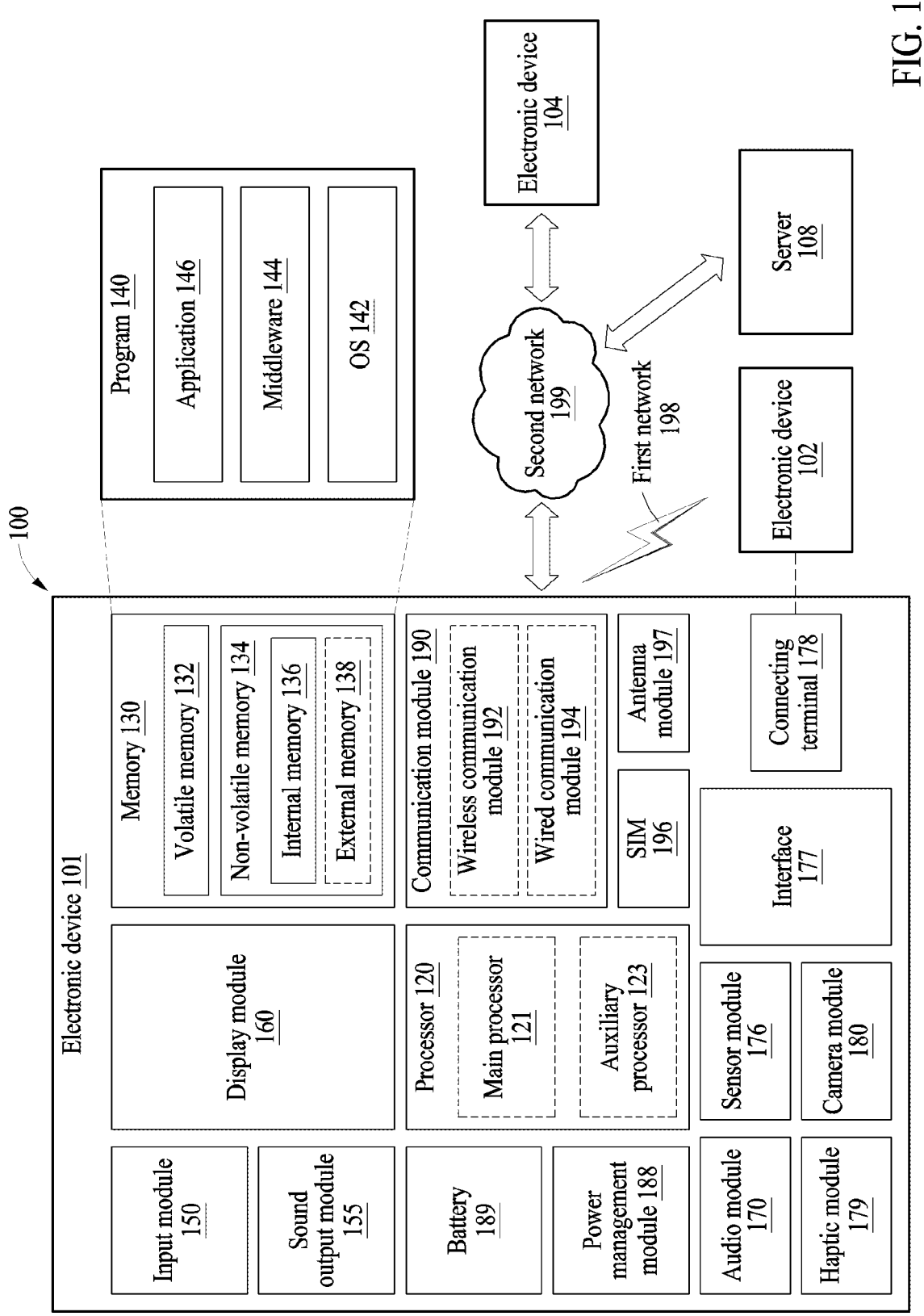
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like components and a repeated description related thereto may not be provided.

FIG. 1 is a block diagram illustrating an example electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added to the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., by wire) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., by wire) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (1-D-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
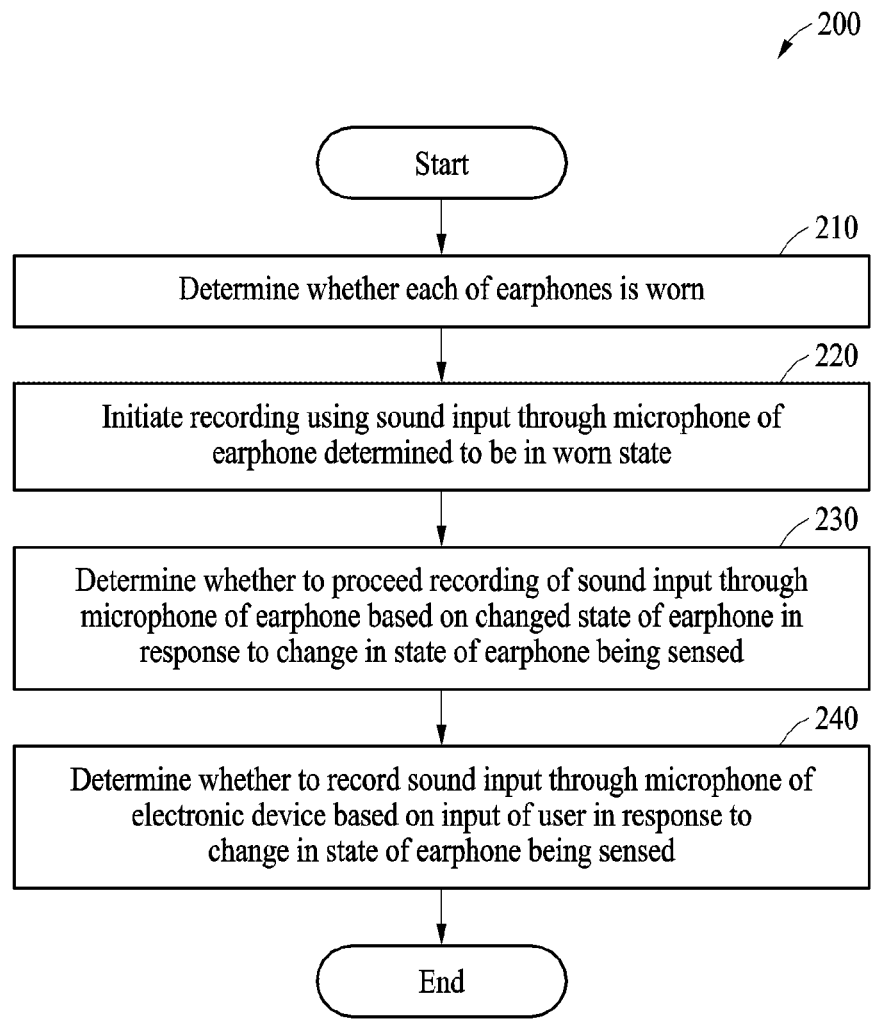
FIG. 2 is a flowchart illustrating an example operation in which an electronic device performs recording according various embodiments.

FIG. 2 is a flowchart illustrating an example operation in which an electronic device performs recording according to various embodiments.

In operation 210, an electronic device (e.g., the electronic device 101 of FIG. 1) may establish communication with a pair of earphones and determine whether each of the earphones is being worn. Hereinafter, whether an earphone is being worn may refer, for example, to whether an earphone is being worn on the body (e.g., an ear of a user) of a user. In response to a determination that an earphone is being worn on the body of a user, the electronic device may determine that the earphone is in a worn state. In response to a determination that the earphone is separated from or removed from the body of the user, the electronic device may determine that the earphone is in an unworn state.

According to an example embodiment, the electronic device may use a microphone provided in each of the earphones to determine whether each of the earphones is being worn. For example, in response to a same sound being input to the microphone of each of the earphones, the electronic device may identify a pattern or a parameter (e.g., magnitude, sensitivity, direction, etc.) of a sound signal corresponding to the corresponding sound to determine whether each of the earphones is being worn.

According to an example embodiment, the electronic device may also determine whether each of the earphones is being worn using a wear detecting sensor (e.g., a touch sensor or a proximity sensor) provided in each of the earphones. For example, the wear detecting sensor provided in each of the earphones may generate sensing data indicating whether each of the earphones is being worn by determining whether each of the earphones is in contact with or close to a body. The electronic device may determine whether each of the earphones is being worn by receiving the sensing data from each of the earphones.

For example, an earphone may be a wired earphone or a wireless earphone for establishing communication with the electronic device. The pair of earphones may include a first earphone that may be worn on one ear of the user and a second earphone that may be worn on the other ear of the user. The first earphone may be an earphone to be worn on the right ear of the user, and the second earphone may be an earphone to be worn on the left ear of the user.

In operation 220, the electronic device may record a sound (e.g., a voice) input through a microphone of at least one earphone determined to be in a worn state between the pair of earphones by initiating recording of a sound signal received from the at least earphone. For example, the at least one earphone determined to be in the worn state between the earphones of the electronic device may convert a sound input through a microphone of a corresponding earphone into a sound signal. The at least one earphone may transmit the sound signal into which the sound was converted to the electronic device. The electronic device may initiate recording of the sound signal received from the at least one earphone. For example, in response to a determination that both of the pair of earphones are in the worn state, the electronic device may initiate the recording using all sounds input through a microphone of each of the earphones. In response to a determination that the pair of earphones (a first earphone and a second earphone) are both being worn on the ears of the user, the electronic device may perform binaural recording by recording a sound input through the microphone of each of the earphones. Binaural recording may refer, for example, to a technique for recording realistic sound using a phase difference between both ears and may be implemented by recording a sound input through microphones placed on both ears of the user. The electronic device may provide a spatial impression to the user by recording each sound input through the microphone of each of the earphones, both earphones being worn on the ears of the user and playing each of the recorded sounds using different speakers. The electronic device, through a manipulation by a user, may create a recording file by performing recording and play the recording file.

As another example, in response to a determination that only one of the pair of earphones is in the worn state, the electronic device may initiate recording only using a sound input through a microphone of the earphone determined to be in the worn state. The electronic device may not use a sound for recording when the sound is input through a microphone of an earphone determined to be in an unworn state. The electronic device may perform mono recording by recording a sound input through a microphone of one of the pair of earphones. Mono recording may be a technique for recording sound using one channel. The electronic device may play a recording file created through mono recording via the pair of earphones to transmit a same sound signal to each of the earphones, and each of the earphones may convert the received sound signal into a sound through a speaker to output the same sound signal.

As another example, in response to a determination that both of the pair of earphones are in the unworn state, the electronic device may initiate recording of a sound input through a microphone of the electronic device. The sound input through the microphone of the electronic device may be converted into a sound signal.

That a sound input through a microphone is being recorded may indicate that an input gain of the corresponding microphone has been controlled to be greater than or equal to a first threshold value. For example, a sound input through a microphone of an earphone may be amplified or converted into a sound signal to have a signal magnitude in accordance with a preset normal recording setting. The electronic device may amplify a sound signal received from an earphone such that the sound signal may have an input gain greater than or equal to the first threshold value.

In addition, the electronic device may not record the sound input through the microphone in response to the input gain of the corresponding microphone being controlled to be less than or equal to a second threshold value. For example, the sound input through a microphone of an earphone may be converted into the sound signal such that the sound signal has a signal magnitude that is in accordance with the preset normal recording setting. The electronic device may attenuate the sound signal received from the earphone such that the sound signal may have an input gain less than or equal to the second threshold value. In addition, the electronic device may not record the sound input through the microphone in response to an operation of the corresponding microphone being deactivated, an operation of receiving a sound signal from a corresponding earphone being omitted, or the sound signal received from the corresponding earphone being discarded.

In operation 230, in response to a change in a state of one earphone being sensed during the recording, the electronic device may determine whether to record a sound input through a microphone of the one earphone according to the changed state of the one earphone.

According to an example embodiment, the electronic device may sense the change in the state of the earphone based on a wear detecting signal regularly received from the earphone. The electronic device may not record the sound input through the microphone of the corresponding earphone in response to sensing that the state of the earphone has changed from the worn state to the unworn state. The electronic device may control an input gain of the microphone of the earphone to be less than or equal to the second threshold value. The electronic device may record the sound input through the microphone of the corresponding earphone in response to sensing that the state of the earphone has changed from the unworn state to the worn state. The electronic device may control the input gain of the microphone of the earphone to be greater than or equal to the first threshold value.

In operation 240, in response to a change in the state of the one earphone being sensed during the recording, the electronic device may determine whether to record the sound input through the microphone of the electronic device based on an input of the user.

Figure 3:
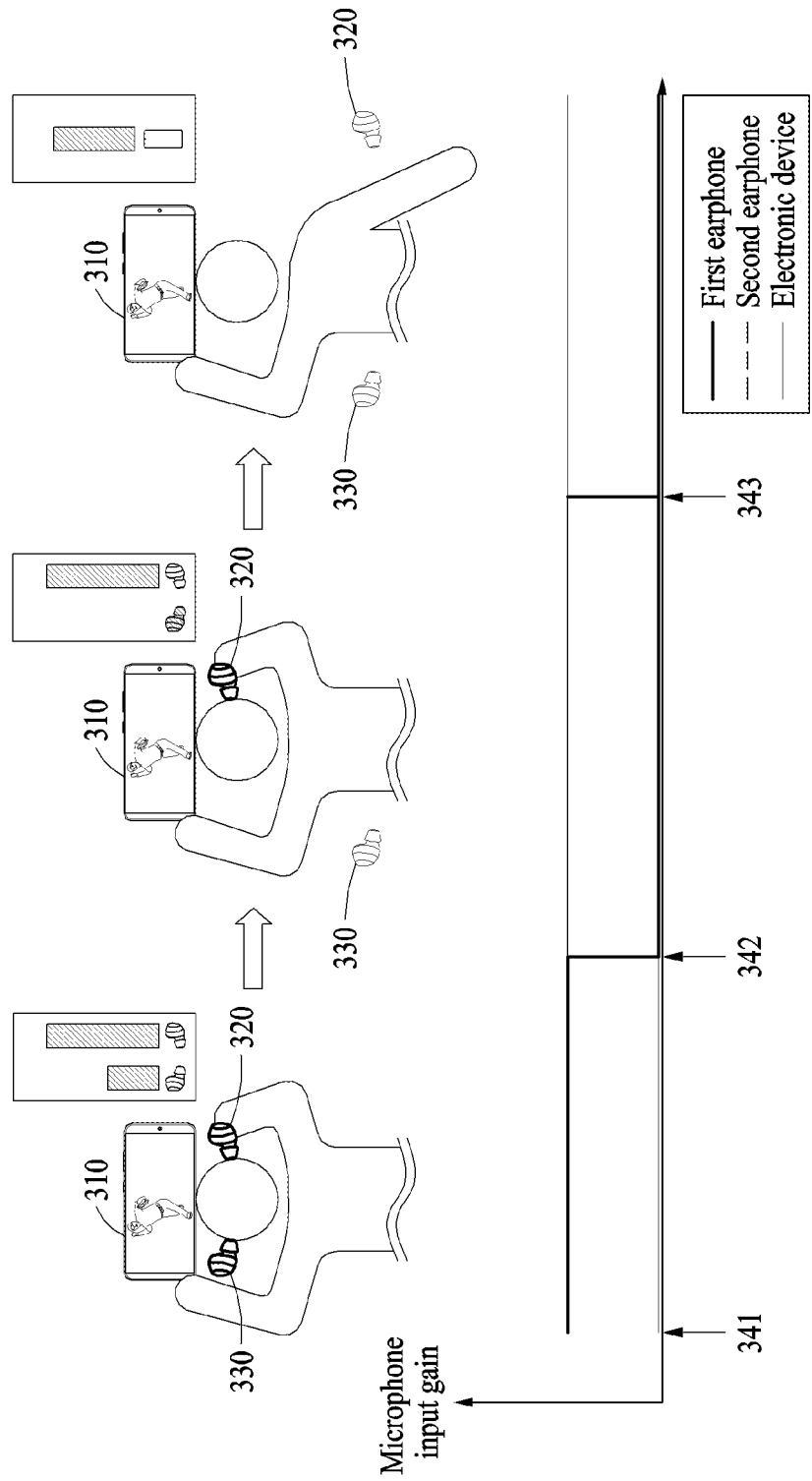
FIG. 3 is a diagram illustrating an example operation in which an electronic device performs recording using a pair of earphones according to various embodiments.

FIG. 3 is a diagram illustrating an example operation in which an electronic device performs recording using a pair of earphones according to various embodiments.

According to an example embodiment, an electronic device 310 (e.g., the electronic device 101 of FIG. 1) may perform recording using a pair of earphones (e.g., a first earphone 320 and a second earphone 330). The first earphone 320 may be an earphone to be worn on the right ear of a user, and the second earphone 330 may be an earphone to be worn on the left ear of the user.

As illustrated in FIG. 3, the electronic device 310 may determine, at a time point 341 of initiating recording, whether each of the first and second earphones 320 and 330 is being worn. For example, in response to a determination that the first and second earphones 320 and 330 are both being worn, the electronic device 310 may initiate recording using all sounds input through a microphone of each of the first and second earphones 320 and 330 and perform binaural recording. The electronic device 310 may control respective input gains of microphones of the first earphone 320 and the second earphone 330 to be greater than or equal to a first threshold value.

At a time point 342, the electronic device 310 may sense a state of the second earphone 330 changing from a worn state to an unworn state. The electronic device 310 may not record a sound input through the microphone of the second earphone 330 in the unworn state. The electronic device 310 may control the input gain of the microphone of the second earphone 330 to be less than or equal to a second threshold value, and the input gain of the microphone of the first earphone 330 may remain the same as before.

At a time point 343, the electronic device 310 may sense a state of the first earphone 320 changing from the worn state to the unworn state. The electronic device 310 may not record a sound input through the microphone of the first earphone 320 of which the state changed to the unworn state. The electronic device 310 may control the input gain of the microphone of the first earphone 320 to be less than or equal to the second threshold value.

According to an example embodiment, when the electronic device 310, in response to the states of the first and second earphones 320 and 330 changing to the unworn state while the electronic device 310 is recording, is not recording sounds input through the microphones of the first and second earphones 320 and 330, the electronic device 310 may record sounds input through a microphone of the electronic device 310. In such an example, the electronic device 310 may control the input gains of the microphones of the first and second earphones 320 and 330 to be less than or equal to the second threshold value and control an input gain of the microphone of the electronic device 310 to be greater than or equal to the first threshold value.

Figure 4A:
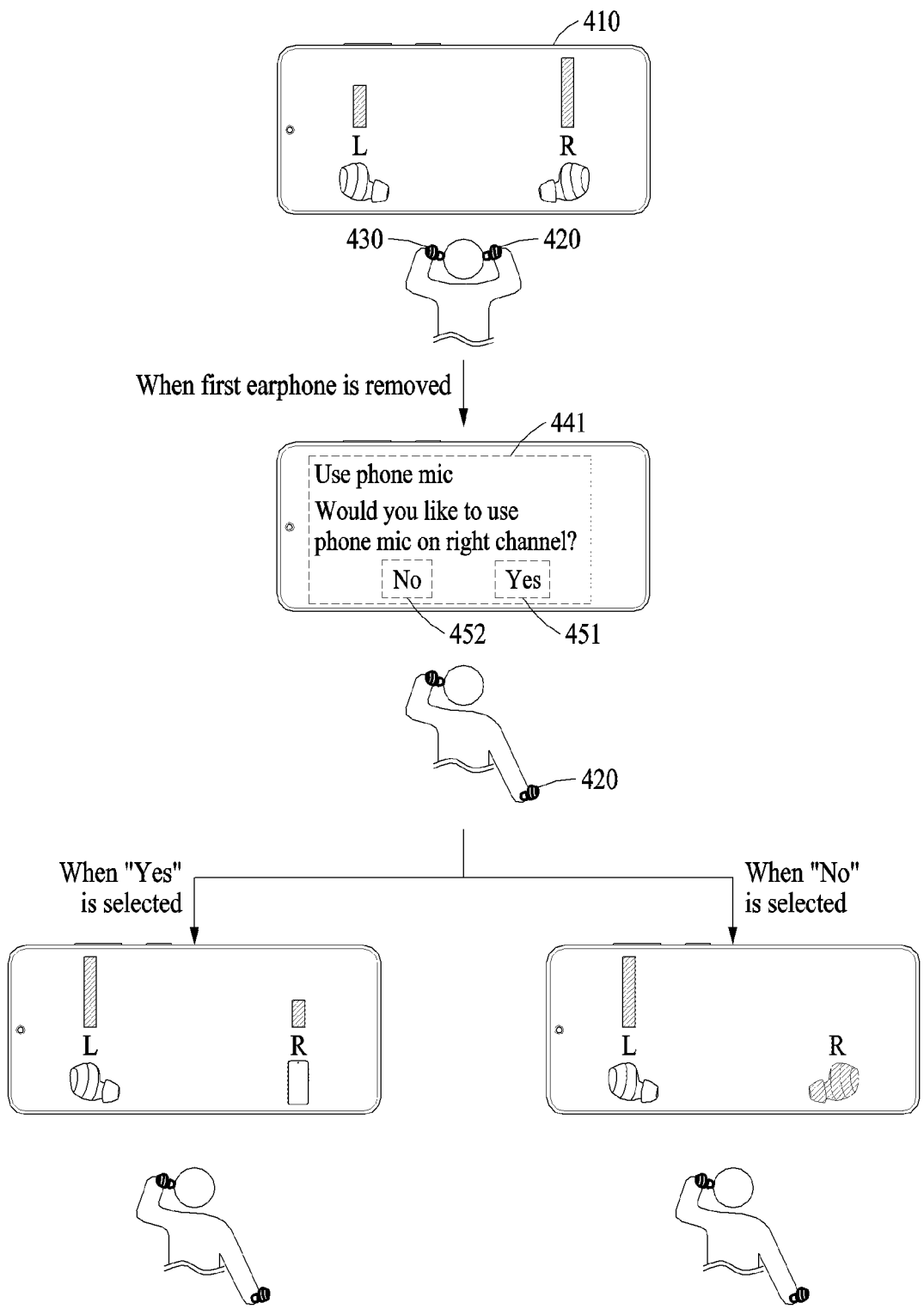
FIGS. 4A and 4B are diagrams illustrating an example operation in which an electronic device determines whether to record a sound input through a microphone of the electronic device according to various embodiments.
Figure 4B:
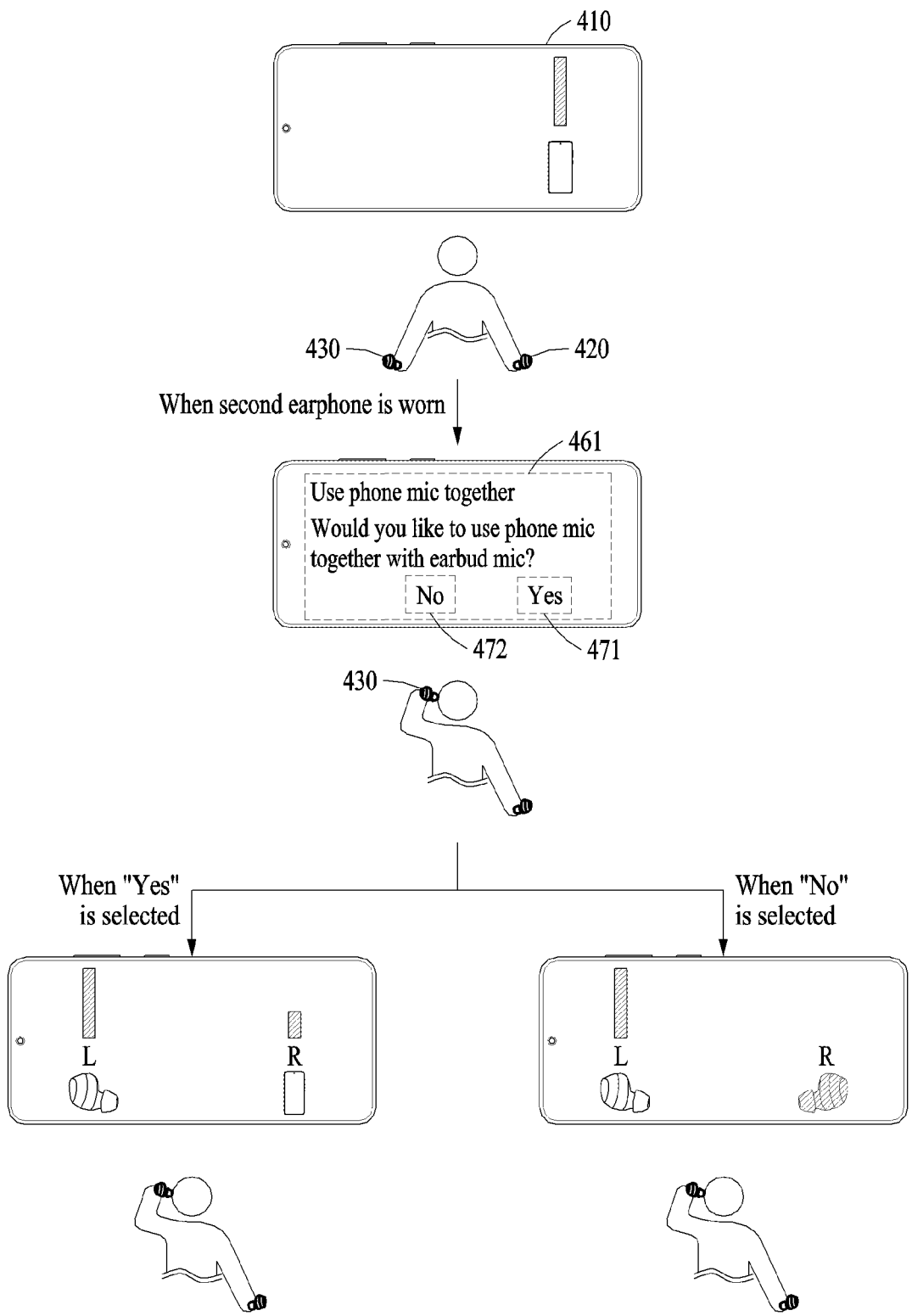

FIGS. 4A and 4B are diagrams illustrating an example operation in which an electronic device determines whether to record a sound input through a microphone of the electronic device according to various embodiments.

Referring to FIG. 4A, according to an example embodiment, in response to a determination that a pair of earphones (e.g., a first earphone 420 and a second earphone 430) are both in a worn state, an electronic device 410 (e.g., the electronic device 101 of FIG. 1) may record all sounds input through microphones of the first and second earphones 420 and 430. In response to a change in a state of one earphone (the first earphone 420 or the second earphone 430) being sensed while the recording is being performed, the electronic device 410 may determine whether to record a sound input through a microphone of the electronic device 410 based on an input of a user.

Hereinafter, it is assumed that a state of the first earphone 420 changes to an unworn state when the first earphone 420 is removed from an ear of the user. The electronic device 410 may deactivate a microphone of the first earphone 420 in response to sensing that the state of the first earphone 420 has changed to the unworn state. In addition, in response to a change in the state of the first earphone 420 being sensed, the electronic device 410 may display, on a display, an interface 441 that presents an inquiry as to whether to change a microphone path to a microphone of the electronic device 410 instead of a microphone of the first earphone 420. The electronic device 410 may display, on the interface 441, a first object 451 for setting the microphone of the electronic device 410 as the microphone path and a second object 452 for not setting the microphone of the electronic device 410 as the microphone path. Hereinafter, that a predetermined microphone is set as a microphone path may indicate that a sound input through the predetermined microphone is being recorded.

Through the interface 441, the user may activate the first object 451 by a manipulation to set the microphone of the electronic device 410 as the microphone path and activate the microphone of the electronic device 410. In other words, the sound input through the microphone of the electronic device 410 may be recorded. For example, activation of an object may include a manipulation, such as, a touch by the user. In response to activation of the first object 451, the electronic device 410 may set the microphone of the second earphone 430 in a worn state and the microphone of the electronic device 410 as the microphone path and record the sound input through the microphone of the second earphone 430 and the sound input through the microphone of the electronic device 410.

Through the interface 441, the user may deactivate the microphone of the electronic device 410 by activating the second object 452 by a manipulation. In response to activation of the second object 452, the electronic device 410 may only set the microphone of the second earphone 430 in the worn state as the microphone path and record the sound input through the microphone of the second earphone 430.

Referring to FIG. 4B, according to an example embodiment, in response to a determination that the pair of the first and second earphones 420 and 430 are both in the unworn state, the electronic device 410 may record the sound input through the microphone of the electronic device 410 instead of the first and second earphones 420 and 430. In response to a change in a state of one earphone (the first earphone 420 or the second earphone 430) being sensed while the recording is being performed, the electronic device 410 may determine whether to record the sound input through the microphone of the electronic device 410 based on the input of the user.

Hereinafter, it is assumed that a state of the second earphone 430 changes to the worn state when the second earphone 430 is being worn on an ear of the user. The electronic device 410 may record the sound input through the microphone of the second earphone 430 in response to sensing that a state of the second earphone 430 has changed to the worn state. In addition, in response to a change in the state of the second earphone 430 being sensed, the electronic device 410 may display, on the display, an interface 461 that presents an inquiry as to whether to set the microphone of the electronic device 410 as an additional microphone path along with the microphone of the second earphone 430. The electronic device 410 may display, on the interface 461, a first object 471 for setting the microphone of the electronic device 410 as the microphone path and a second object 472 for not setting the microphone of the electronic device 410 as the microphone path.

Through the interface 461, the user may activate the first object 471 by a manipulation to keep the microphone of the electronic device 410 as the microphone path and keep the microphone of the electronic device 410 activated. In other words, the electronic device 410 may record the sound input through the microphone of the electronic device 410 in addition to the sound input through the microphone of the second earphone 430. Likewise, through the interface 461, the user may activate the second object 472 by a manipulation to deactivate the microphone of the electronic device 410. In response to activation of the second object 472, the electronic device 410 may only set the microphone of the second earphone 430 in the worn state as the microphone path and only record the sound input through the microphone of the second earphone 430.

Figure 5:
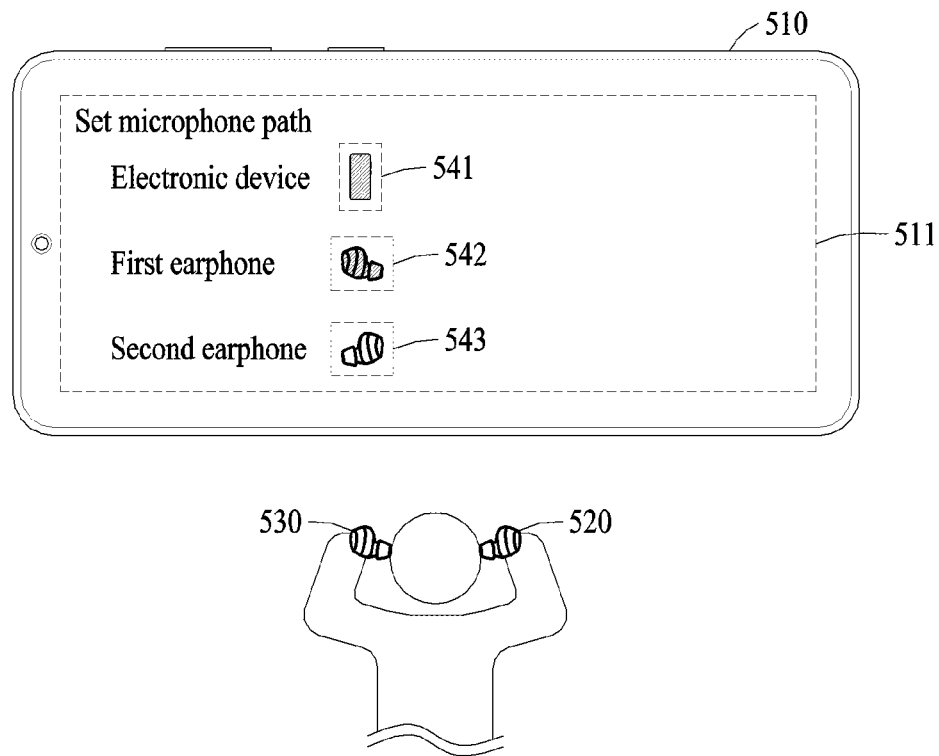
FIG. 5 is a diagram illustrating an example operation in which an electronic device selects a microphone path to be used for recording based on a manual input of a user according to various embodiments.

FIG. 5 is a diagram illustrating an example operation in which an electronic device selects a microphone path used for recording based on a manual input of a user according to various embodiments.

According to an example embodiment, an electronic device may set a microphone path to be used for recording based on an input of a user. An electronic device 510 may set a microphone of the electronic device 510 or microphones of earphones (e.g., a first earphone 520 and a second earphone 530) as a microphone path to be used for the recording based on an input of a user and record a sound input through the set microphone path.

According to an example embodiment, the electronic device 510 may display, on a display, an interface 511 to receive an input to set the microphone path used for the recording. The interface 511 may display an object 541 corresponding to the electronic device 510, an object 542 corresponding to the first earphone 520, and an object 543 corresponding to the second earphone 530. Through the interface 511, the user may activate at least one object by a manipulation to set a microphone of a device corresponding to the activated object as the microphone path. For example, in response to the object 541 corresponding to the electronic device 510 and the object 542 corresponding to the first earphone 520 being activated by the user, the microphone of the electronic device 510 and the microphone of the first earphone 520 may be set as the microphone path. In such an example, the electronic device 510 may record a sound input through the microphone of the electronic device 510 and a sound input through the microphone of the first earphone 520.

Figure 6:
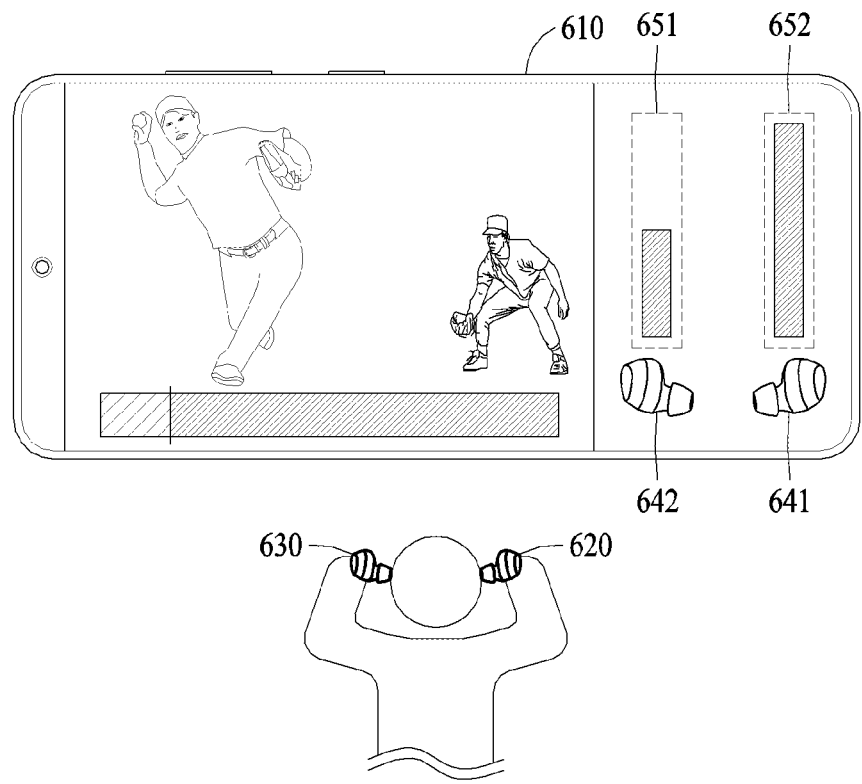
FIG. 6 is a diagram illustrating an example operation in which an electronic device displays a device being used for recording and a volume level of a sound input through a microphone of the device according to various embodiments.

FIG. 6 is a diagram illustrating an example operation in which an electronic device displays a device being used for recording and a volume level of a sound input through a microphone of the device according to various embodiments.

According to an example embodiment, an electronic device 610 (e.g., the electronic device 101 of FIG. 1) may display, on a display, a device used for recording among the electronic device 610 and earphones (e.g., a first earphone 620 and a second earphone 630) for each time point at which recording is performed. For example, as illustrated in FIG. 6, in response to performing recording using the first earphone 620 and the second earphone 630 at a predetermined time point at which recording is to be performed, the electronic device 610 may display an icon 641 corresponding to the first earphone 620 and an icon 642 corresponding to the second earphone 641 on the display. The user may easily identify a device used for the recording at a corresponding time point through an icon displayed on the display. According to an example embodiment, the electronic device 610 may also display a volume level of a sound input through a microphone of the device used for the recording on the display. For example, in response to using the first earphone 620 and the second earphone 630 for the recording, the electronic device 610 may display an interface 651 indicating a volume level of a sound input through a microphone of the first earphone 610 and an interface 652 indicating a volume level of a sound input through a microphone of the second earphone 630 on the display.

According to an example embodiment, the electronic device may display the device used for the recording among the electronic device 610 and the first and second earphones 620 and 630 for each time point at which a recording file is played created by performing the recording. The electronic device 610 may record a sound signal corresponding to a sound input through a microphone together with an image signal received from an image processing device and create a recording file based on the recording. In response to the recording file being played, the electronic device 610 may display, on the display, the device used for the recording among the electronic device 610 and the wireless earphones 620 and 630 for each time point at which the recording file is played. In other words, the electronic device 610 may display the device being used for the recording on the display at the time point at which the recording is performed corresponding to the time point at which the recording file is played. For example, in response to the recording being performed using the first earphone 620 and the electronic device 610 at a predetermined time point at which the electronic device 610 plays the recording file, icons respectively corresponding to the first earphone 620 and the electronic device 610 may be displayed on the display.

Figure 7A:
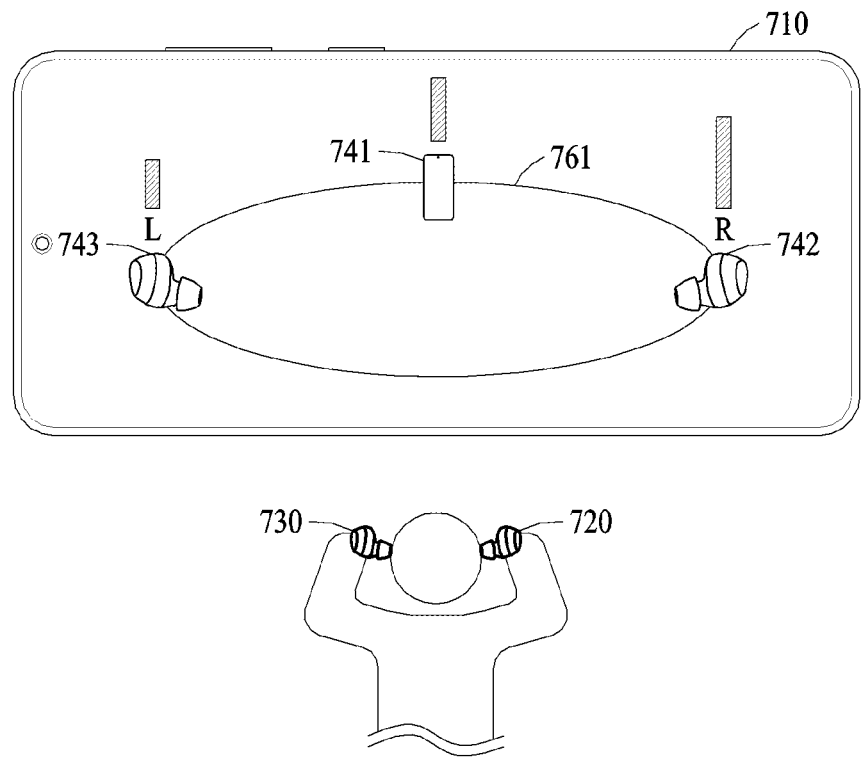
FIGS. 7A and 7B are diagrams illustrating an example operation in which an electronic device calculates a relative position for each of earphones and performs recording according to various embodiments.
Figure 7B:
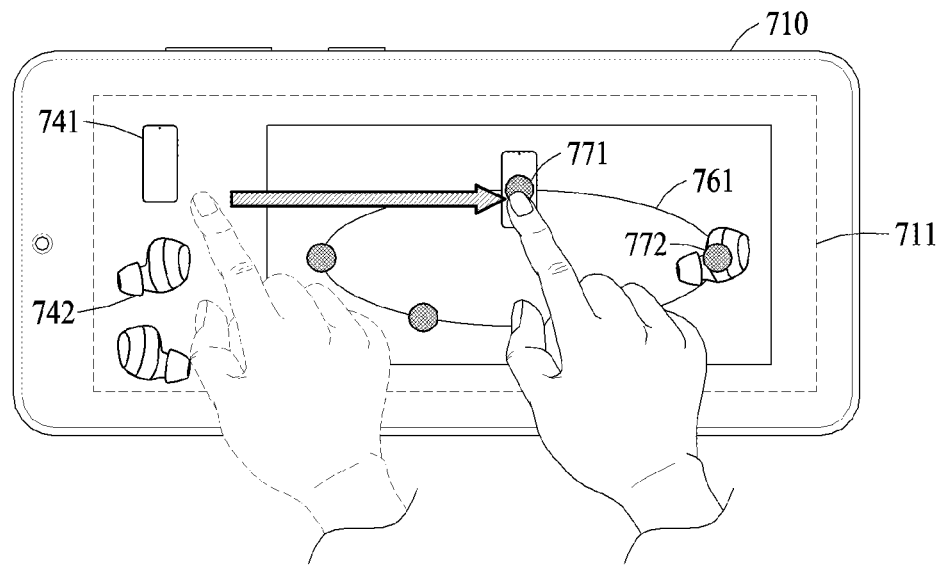

FIGS. 7A and 7B are diagrams illustrating an example operation in which an electronic device calculates a relative position for each of earphones and performs recording according to various embodiments.

According to an example embodiment, an electronic device 710 may calculate a relative position of a first earphone 720 and a relative position of a second earphone 730 based on the electronic device 710. For example, the electronic device and the earphones may each include an ultra-wideband (UWB) communication module, and the electronic device may calculate the relative position of each of the earphones using the UWB communication module. The electronic device may calculate a relative distance of an earphone by identifying a received signal strength indicator (RSSI) for the earphone. In response to calculating the relative position of the earphone, the electronic device may precisely measure the relative position of the earphone using a triangulation technique by pointing at the corresponding earphone represented in a graphical user interface (GUI) to operate the UWB module. The electronic device may additionally use a gyro sensor to measure the relative position of the earphone more precisely.

According to an example embodiment, the electronic device 710 may synthesize sound signals corresponding to a plurality of sounds input through a microphone path based on the relative positions of the first and second earphones 720 and 730 calculated based on the electronic device 710. According to an example embodiment, while recording, the electronic device 710 may calculate and store the relative position of the first earphone 720 and the relative position of the second earphone 730 based on the electronic device 710 for each time point at which recording is performed. The electronic device 710 may synthesize the sound signals corresponding to the plurality of sounds input through the microphone path to create a recording file. The plurality of sound signals may be synthesized based on the relative position of the first earphone 720 and the relative position of the second earphone 730. For example, in response to microphones of the first and second earphones 720 and 730 being set as the microphone path, the electronic device 710 may transform a sound signal corresponding to a sound input through a microphone of the first earphone 720 such that the sound signal corresponds to the relative position of the first earphone 720, also transform a sound signal corresponding to a sound input through a microphone of the second earphone 730 such that the sound signal corresponds to the relative position of the second earphone 730, and synthesize the transformed sound signals.

According to an example embodiment, the electronic device 710 may display, on a display, an icon corresponding to a device being used for the recording by placing the icon on a screen area determined based on the respective relative positions of the first and second earphones 720 and 730. Referring to FIG. 7A, it is assumed that that the electronic device 710 performs recording using the electronic device 710 and the first and second earphones 720 and 730. The electronic device 710 may display, on the display, an icon 741 corresponding to the electronic device 710 and icons 742 and 743 respectively corresponding to the first and second earphones 720 and 730 by placing the icons on the screen area determined based on the respective relative positions of the earphones.

For example, the electronic device 710 may place icons corresponding to the device being used for the recording on a closed curve 761. The electronic device 710 may place the icon 741 corresponding to the electronic device and the icon 742 corresponding to the first earphone on the closed curve 761 such that a curved distance from the icon 741 corresponding to the electronic device to the icon 742 corresponding to the first earphone on the closed curve 761 corresponds to an actual physical distance between the electronic device 710 and the first earphone 720. In addition, the electronic device 710 may place the icon 741 corresponding to the electronic device and the icon 743 corresponding to the second earphone on the closed curve 761 such that a curved distance from the icon 741 corresponding to the electronic device to the icon 743 corresponding to the second earphone on the closed curve 761 corresponds to an actual physical distance between the electronic device 710 and the second earphone 730.

Referring to FIG. 7B, the electronic device 710 that may not calculate the relative positions of the first and second earphones 720 and 730 may receive the relative positions of the first and second earphones 720 and 730 from the user based on the electronic device 710. For example, the electronic device 710 may display, on the display, an interface 711 to determine the relative positions of the first and second earphones 720 and 730. In the interface 711, the user may place, on the closed curve 761, at least one of the icon corresponding to the electronic device 710 and the icons respectively corresponding to the first and second earphones 720 and 730. For example, the user may change a position of an icon with a drag-and-drop gesture. The electronic device 710 may determine the relative positions of the first and second earphones 720 and 730 with respect to the electronic device 710 based on the positions of the icons placed on the closed curve 761. For example, a user who uses the electronic device 710 and the first earphone 720 for recording may place the icon 741 corresponding to the electronic device 710 at a point 771 on the closed curve 761 with the drag-and-drop gesture and place the icon 742 corresponding to the first earphone 720 at a point 772 on the closed curve 761. The electronic device 710 may determine that the first earphone 720 is placed on a right side based on the electronic device 710 and synthesize sound signals corresponding to sounds input through the microphones of the electronic device 710 and the first earphone 720 based on the relative position of the first earphone 720.

Figure 8:
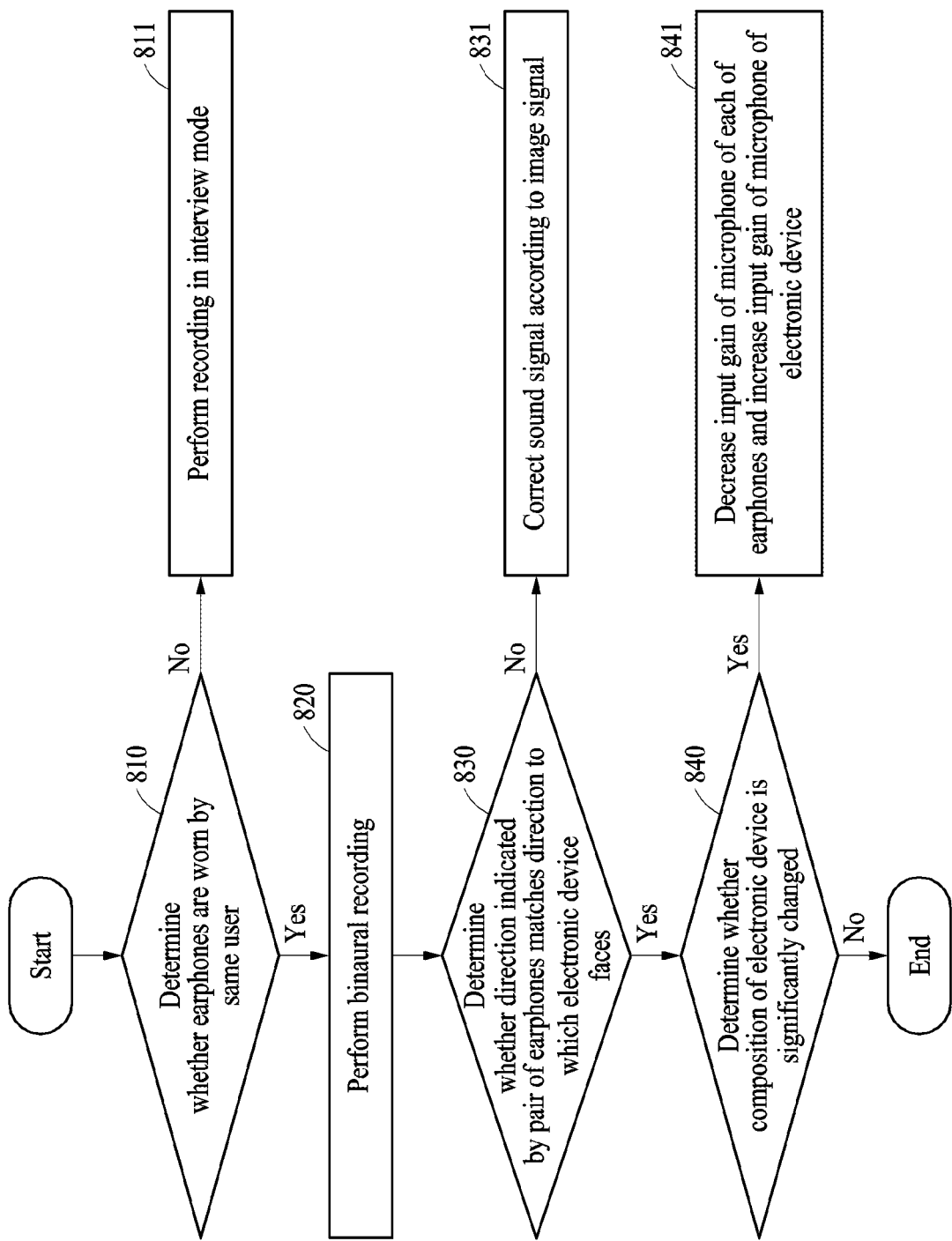
FIG. 8 is a flowchart illustrating an example operation in which an electronic device performs recording in response to a determination that both of a pair of earphones are being worn according to various embodiments.

FIG. 8 is a flowchart illustrating an example operation in which an electronic device performs recording in response to a determination that both of a pair of earphones are being worn according to various embodiments.

According to an example embodiment, an electronic device (e.g., the electronic device 101 of FIG. 1) may determine that a pair of earphones (a first earphone and a second earphone) are both in a worn state.

In operation 810, the electronic device may determine whether the earphones are both being worn by the same user. According to an example embodiment, the electronic device may determine whether the earphones are both being worn by the same user based on a physical distance between the first earphone and the second earphone. In response to the physical distance between the first earphone and the second earphone being greater than or equal to a threshold distance, the electronic device may determine that the earphones are being worn by different users. For example, the threshold distance may be 1 meter (m), but is not limited thereto. According to another example embodiment, the electronic device may determine whether the earphones are both being worn by the same user by comparing data obtained from each of the earphones. For example, an earphone may radiate a white noise from a sound source to an ear of a user on which an earphone is being worn to calculate a volume of the ear of the user (this process is called a fit-test) and may generate data related to the ear on which the corresponding earphone is being worn. The electronic device may receive data related to the ear on which the corresponding earphone is being worn from each of the earphones and determine whether the earphones are both being worn by the same user by comparing the received data.

In operation 811, in response to a determination that the earphones are being worn by different users, the electronic device may perform recording in an interview mode.

Figure 9:
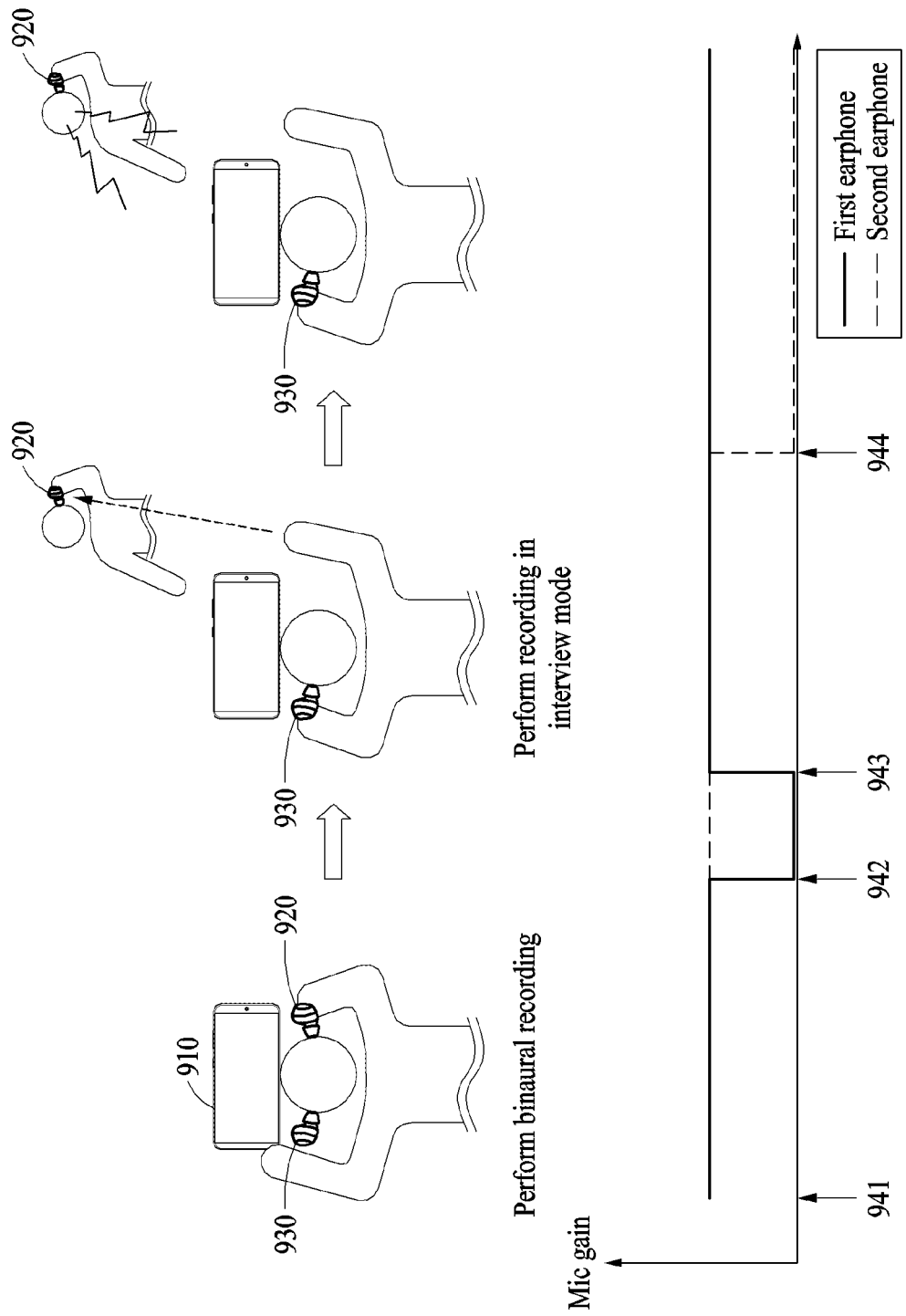
FIG. 9 is a diagram illustrating an example operation in which an electronic device performs recording in an interview mode according to various embodiments.

FIG. 9 is a diagram illustrating an example operation in which an electronic device performs recording in an interview mode according to various embodiments. According to an example embodiment, in response to a determination that earphones are being worn by different users, an electronic device may enter an interview mode. In response to entering the interview mode, the electronic device may individually perform recording of sound signals corresponding to sounds input through a microphone of each of the earphones instead of performing binaural recording using the sounds input through the microphones of the earphones. In other words, in response to entering the interview mode, the electronic device may individually create a recording file using a sound input through a microphone of a first earphone and another recording file using a sound input through a microphone of a second earphone. The electronic device may create a recording file using all sounds input through the microphones of the earphones in response to binaural recording being performed, and the electronic device may separately perform recording using the microphone of each of the earphones as an individual microphone in response to entering the interview mode. Hereinafter, it is described that recording, performed by the electronic device, using each of the sounds input through the microphone of each of the earphones is recording performed in the interview mode.

In addition, according to an example embodiment, the electronic device may change an input gain of a microphone when entering the interview mode. When entering the interview mode, the electronic device may determine an earphone being worn by a speaker among the earphones based on a sound signal corresponding to a sound input through the microphone of each of the earphones while recording. The electronic device may determine the earphone being worn by the speaker for each time point at which recording is performed. For example, the electronic device may determine that an earphone of a sound signal with a higher volume level among sound signals corresponding to sounds input through the respective microphones of the earphones is the earphone being worn by the speaker. As another example, the electronic device may determine that an earphone of a sound signal with a higher average volume level between a current time point and a time point before a predetermined time from the current time point is the earphone being worn by the speaker among the sound signals corresponding to the sounds input through the respective microphones of the earphones. However, a scheme the electronic device uses to determine an earphone being worn by a speaker is not limited to the above, and various other schemes may be possible.

According to an example embodiment, the electronic device may control an input gain of a microphone of an earphone being worn by a current speaker to be greater than or equal to a first threshold value. The electronic device may control an input gain of a microphone of an earphone other than the earphone being worn by the speaker among the earphones to be less than or equal to a second threshold value. As a speaker may change continuously while recording is being performed, which earphone is the earphone being worn by the speaker may change continuously.

As illustrated in FIG. 9, an electronic device 910 may determine whether each of first and second earphones 920 and 930 is being worn at a time point 941 at which recording is initiated. In response to a determination that both the first and second earphones 920 and 930 are being worn, the electronic device 910 may initiate recording using all sounds input through microphones of the first and second earphones 920 and 930. At the time point 942, the electronic device 910 may sense that a state of the first earphone 920 has changed from a worn state to an unworn state. The electronic device 910 may control the input gain of the microphone of the first earphone 920 to be less than or equal to a second threshold value. At a time point 943, the electronic device 910 may sense that the state of the first earphone 920 has changed from the unworn state to the worn state and determine that the first earphone 920 and the second earphone 930 are being worn by different users. In response to a determination that the first earphone 920 and the second earphone 930 are being worn by different users, the electronic device 910 may perform recording in an interview mode. In other words, when entering the interview mode, the electronic device may create separate recording files individually using sounds input through the respective microphones of the earphones instead of using a scheme such as binaural recording that creates a recording file using all sounds input through the microphones of the earphones. In addition, in response to a determination that an earphone being worn by a speaker at a predetermined recording time point 944 is the first earphone 920, the electronic device 910 may control an input gain of the microphone of the first earphone 920 to be greater than or equal to a first threshold value. Here, the electronic device 910 may control an input gain of the microphone of the second earphone 930 to be less than or equal to the second threshold value.

According to an example embodiment, when recording in the interview mode, the electronic device 910 may transmit a sound signal corresponding to a sound input through a microphone of the earphone worn by the speaker to the other earphone. The other earphone may output the sound signal corresponding to the sound input through the earphone being worn by the speaker. According to an example embodiment, when recording in the interview mode, the electronic device may determine languages respectively corresponding to sounds input through the microphones of the earphones. In response to a determination that the languages respectively corresponding to the sounds input through the microphones of the earphones are different from each other, the electronic device may transform the sound signal corresponding to the sound input through the microphone of the earphone being worn by the speaker to correspond to a language corresponding to the sound input through the microphone of the other earphone and transmit the transformed sound signal to the other earphone.

According to an example embodiment, the electronic device may identify a speaker corresponding to a sound signal of a sound input through a microphone path while recording. For example, the electronic device may determine whether the speaker corresponding to the sound signal of the sound input through the microphone path exists among speakers previously registered in the electronic device. In response to a determination that the speaker corresponding to the sound signal of the sound input through the microphone path and a speaker previously registered in the electronic device are identical, the electronic device may create a recording file by transforming the sound signal according to a setting value corresponding to the previously registered speaker.

Referring to FIG. 8 again, in operation 820, in response to a determination that the earphones are being worn by the same user, the electronic device may perform binaural recording using the sound signal corresponding to the sound input through the microphones of the earphones.

In operation 830, the electronic device may determine whether a direction indicated by the pair of earphones matches a direction to which the electronic device is facing. For example, the electronic device may determine the direction indicated by the pair of earphones based on a gyro rotation value received from each of the earphones and the respective relative positions calculated with respect to each of the earphones. The direction indicated by the pair of earphones may be a direction a user is gazing while wearing the earphones on both ears. The direction to which the electronic device is facing may be a direction in which a camera of the electronic device performs capturing. The electronic device may record an image signal received from an image processing device together with the sound signals received from the earphones. The sound signal and the image signal may match only when the direction to which the electronic device is facing matches the direction indicated by the pair of earphones. For example, in response to a movement of the head of a user wearing the pair of earphones, the direction indicated by the pair of earphones may change, which leads to an issue that the sound signal and the image signal do not match. In such an example, the electronic device may output an alarm to guide a movement of the user such that the direction indicated by the pair of earphones matches the direction the electronic device is facing.

In operation 831, in response to the direction indicated by the pair of earphones not matching the direction to which the electronic device is facing, the electronic device may correct the sound signal according to the image signal and create a recording file using the corrected sound signal and the image signal.

In operation 840, in response to the direction indicated by the pair of earphones matching the direction to which the electronic device is facing, the electronic device may determine whether a composition of the electronic device has significantly changed. Here, the composition of the electronic device may be a composition captured by the electronic device. The captured composition may represent an arrangement of a subject of interest in a frame of a view finder. For example, the electronic device may identify a subject of interest around the electronic device through a sensor. The electronic device may determine the composition to be captured according to a distance, angle, and direction with respect to the identified subject of interest. According to an example embodiment, in response to a new subject of interest being arranged in the frame of the view finder, the electronic device may determine that the composition of the electronic device has significantly changed.

In operation 841, in response to the composition of the electronic device being significantly changed, the electronic device may set a microphone of the electronic device as an additional microphone path, decrease an input gain of the microphone of each of the earphones, and increase an input gain of the microphone of the electronic device. According to an example embodiment, the electronic device may control the input gain of the microphone of the electronic device to be higher than the input gain of the microphone of each of the earphones. For example, in response to a significant change in the composition of the electronic device, the electronic device may increase the input gain of the microphone of the electronic device to more focus on a sound generated from the identified subject of interest. Furthermore, the electronic device may intensively receive a sound from a point where the identified subject of interest is located using a beam-forming technique.

Figure 10:
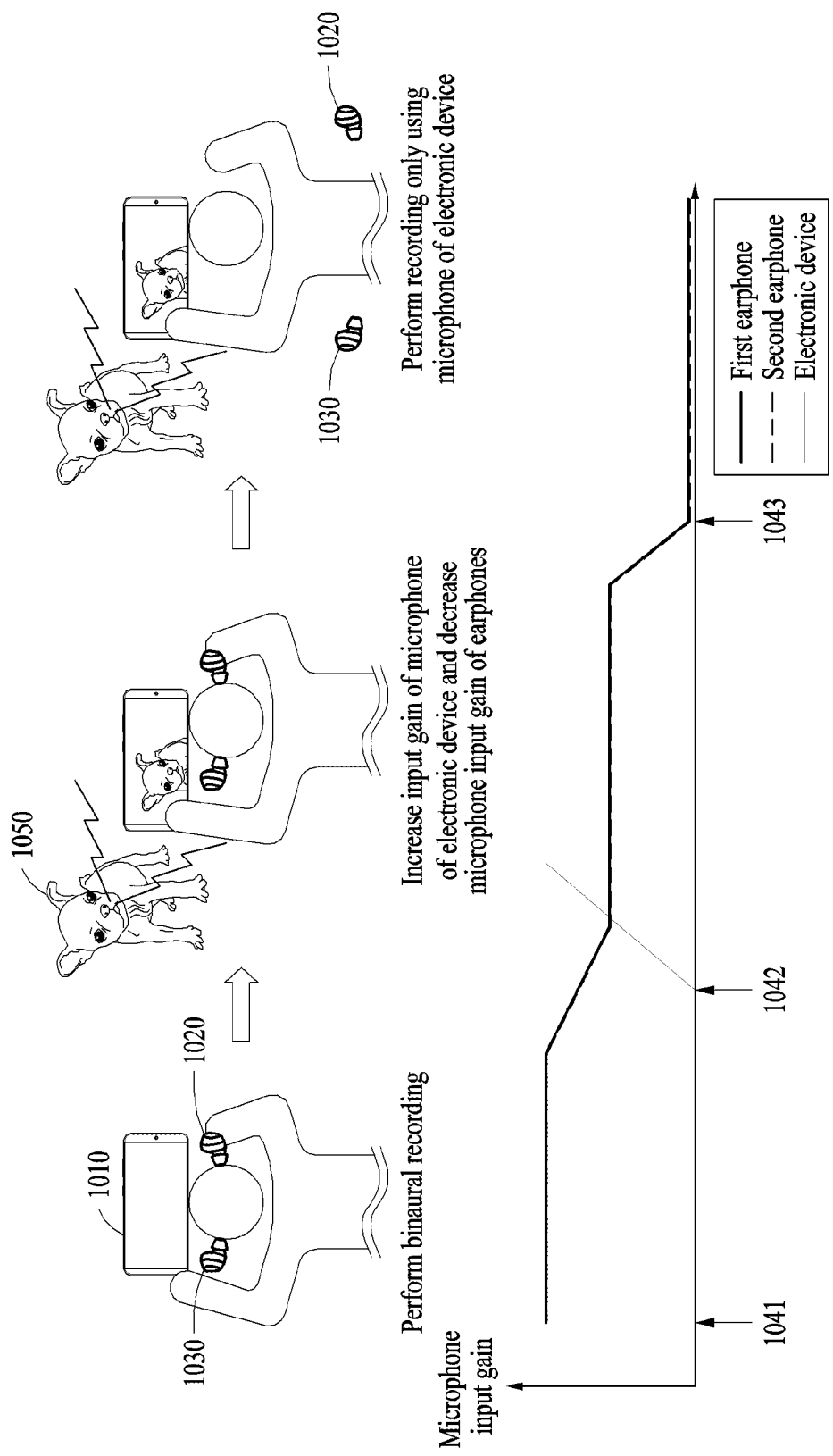
FIG. 10 is a diagram illustrating an example operation in which an electronic device performs recording in response to a composition of the electronic device being significantly changed according to various embodiments.

FIG. 10 is a diagram illustrating an example operation in which an electronic device performs recording in response to a composition of the electronic device being significantly changed according to various embodiments. Referring to FIG. 10, in response to a significant change in a composition of an electronic device, the electronic device may change an input gain of a microphone while recording. At a time point 1041 of initiating recording, an electronic device 1010 may determine whether each of earphones (e.g., a first earphone 1020 and a second earphone 1030) is being worn. In response to a determination that both the first and second earphones 1020 and 1030 are in a worn state, the electronic device 1010 may initiate recording using all sounds input through microphones of the first and second earphones 1020 and 1030. At a time point 1042, composition of the electronic device 1010 may change so that a subject 1050 may be arranged in a frame of a view finder of the electronic device 1010. In other words, a significant change in the composition of the electronic device 1010 may occur. In response to a significant change in the composition of the electronic device 1010, a microphone of the electronic device 1010 may be used as an additional microphone path. For example, in response to a significant change in the composition of the electronic device 1010, the electronic device 1010 may increase an input gain of the microphone of the electronic device 1010 to a first threshold value or more and decrease input gains of the microphones of the first and second earphones 1020 and 1030 to a third threshold value or less. The third threshold value may be a value between the first threshold value and the second threshold value. For example, the electronic device 1010 that performs an operation of capturing a subject 1050 making a sound while enlarging the same may increase the input gain of the microphone of the electronic device 1010 to the first threshold value or more. At a time point 1043, the electronic device 1010 may decrease the input gains of the microphones of the first earphone 1020 and the second earphone 1030 to the second threshold value or less when sensing that states of the first earphone 1020 and the second earphone 1030 removed from the ears of a user have changed to an unworn state.

Figure 11:
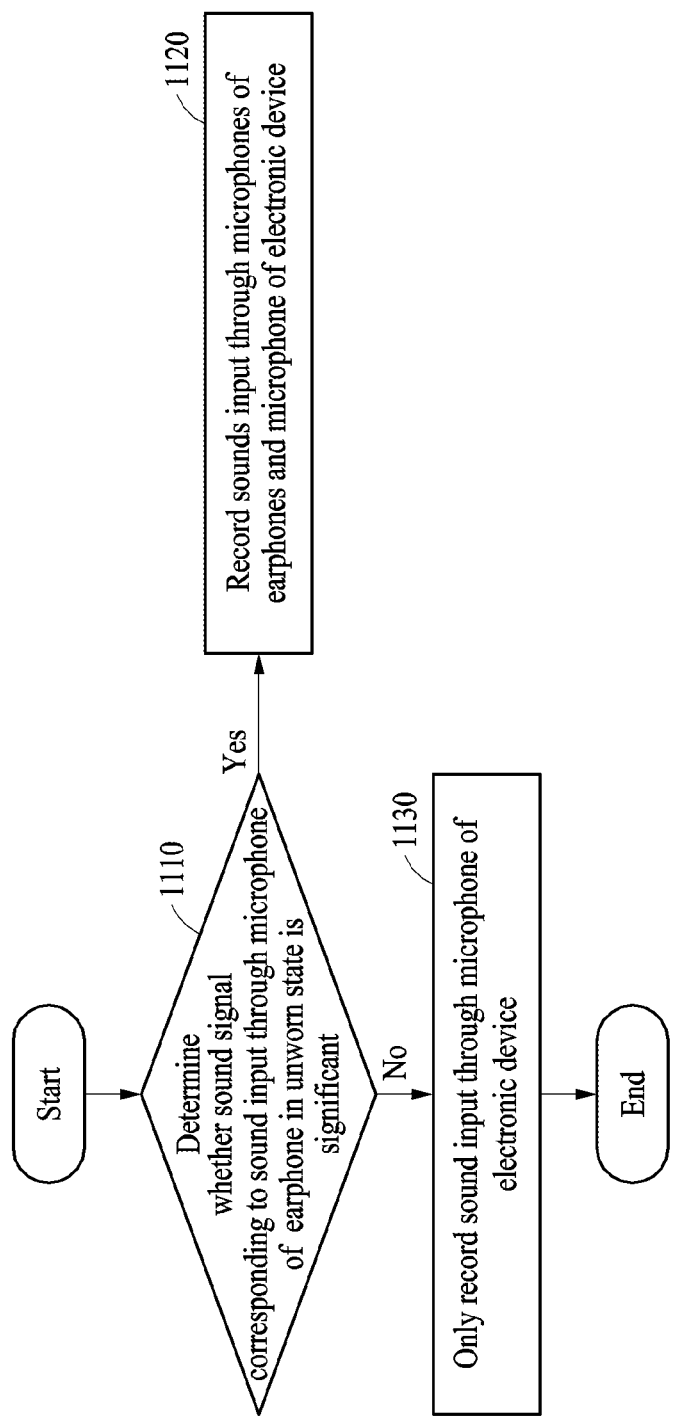
FIG. 11 is a flowchart illustrating an example operation in which an electronic device performs recording in response to a determination that only one of a pair of earphones is being worn according to various embodiments.

FIG. 11 is a flowchart illustrating an example operation in which an electronic device performs recording in response to a determination that only one of a pair of earphones is being worn according to various embodiments.

According to an example embodiment, an electronic device (e.g., the electronic device 101 of FIG. 1) may determine that only one of a pair of earphones (a first earphone and a second earphone) is in a worn state.

In operation 1110, in response to a determination that only one of the earphones is in the worn state and the other earphone is in an unworn state, the electronic device may determine whether a sound signal corresponding to a sound input through a microphone of the earphone in the unworn state is significant. According to an example embodiment, in response to a determination that the sound signal corresponding to the sound input through the microphone of the earphone in the unworn state is significant, the electronic device may additionally record the sound input through the microphone of the earphone in the unworn state. For example, in response to a determination that the sound signal is generated by a user utterance through sound recognition and speaker recognition, the electronic device may determine that the corresponding sound signal is significant. As another example, in response to a magnitude of a sound signal that is input being greater than or equal to a threshold magnitude, the electronic device may determine that the corresponding sound signal is significant. For example, the threshold magnitude may be 3 decibels (dB), but is not limited thereto.

In operation 1120, in response to a determination that the sound signal corresponding to the sound input through the microphone of the earphone in the unworn state is significant, the electronic device may record sound signals corresponding to sounds input through microphones of the earphone in the unworn state, the earphone in the worn state, and the electronic device. According to an example embodiment, in response to a determination that the sound signal corresponding to the sound input through the microphone of the earphone in the unworn state and the sound signal corresponding to the sound input through the microphone of the earphone in the worn state are identical or similar, the electronic device may perform stereo recording of sound signals corresponding to sounds input through microphones of the first earphone and the second earphone and perform additional recording of the sound signal corresponding to the sound input through the microphone of the electronic device separately from the earphones. In other words, the electronic device may perform stereo recording by creating a recording file using the sound signals corresponding to the sounds input through the microphones of the first earphone and the second earphone and create a separate recording file using the sound signal corresponding to the sound input through the microphone of the electronic device. Stereo recording may be a scheme for performing recording using two channels simultaneously. According to an example embodiment, in response to the sound signal corresponding to the sound input through the microphone of the earphone in the unworn state and the sound signal corresponding to the sound input through the microphone of the earphone in the worn state being different, the electronic device may separately record sound signals corresponding to sounds input through the microphones of the earphones and the microphone of the electronic device instead of performing stereo recording. In other words, the electronic device may separately record sound signals respectively corresponding to sounds input through the microphone of the first earphone, the microphone of the second earphone, and the microphone of the electronic device to create three separate recording files.

In operation 1130, in response to the sound signal corresponding to the sound input through the microphone of the earphone in the unworn state not being significant, the electronic device may only record the sound input through the microphone of the electronic device.

Figure 12:
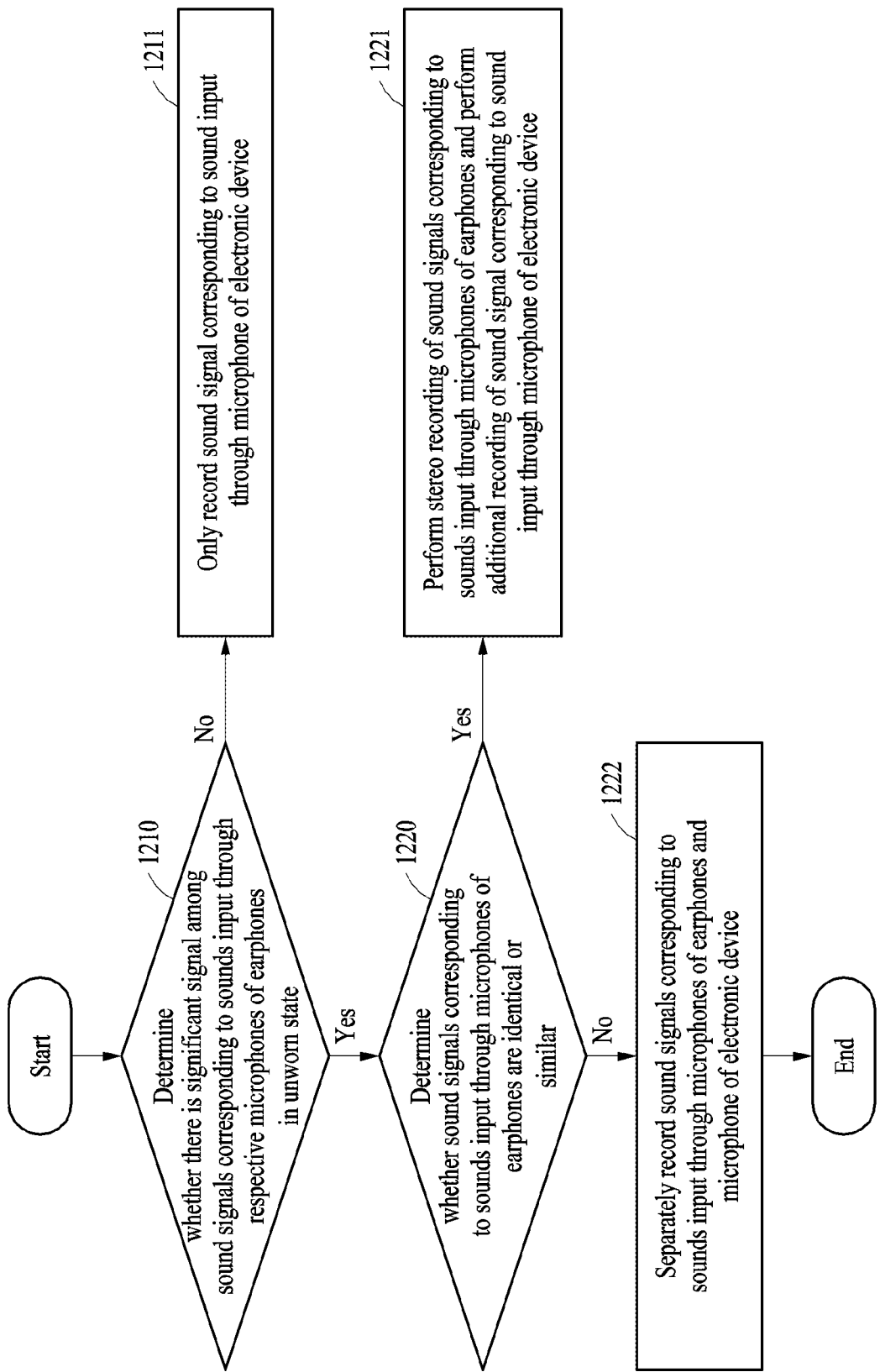
FIG. 12 is a flowchart illustrating an example operation in which an electronic device performs recording in response to a determination that both of a pair of earphones are not being worn according to various embodiments.

FIG. 12 is a flowchart illustrating an example operation in which an electronic device performs recording in response to a determination that both of a pair of earphones are not being worn according to various embodiments.

According to an example embodiment, an electronic device (e.g., the electronic device 101 of FIG. 1) may determine that a pair of earphones (a first earphone and a second earphone) are both in an unworn state.

In operation 1210, in response to a determination that the earphones are both in the unworn state, the electronic device may determine whether there is a significant signal among sound signals corresponding to sounds input through respective microphones of the earphones in the unworn state.

In operation 1211, in response to a determination that all sound signals corresponding to the sounds input through the respective microphones of the earphones in the unworn state are not significant, the electronic device may only record a sound signal corresponding to a sound input through a microphone of the electronic device.

In operation 1220, in response to a determination that at least one of the sound signals corresponding to the sounds input through the respective microphones of the earphones in the unworn state is significant, the electronic device may determine whether the sound signals corresponding to the sounds input through the microphones of the earphones are identical or similar.

In operation 1221, in response to a determination that the sound signals corresponding to the sounds input through the microphones of the earphones are identical or similar, the electronic device may perform stereo recording of sound signals corresponding to sounds input through microphones of the first and second earphones and perform an additional recording of the sound signal corresponding to the sound input through the microphone of the electronic device separately from the earphones. In other words, the electronic device may perform stereo recording by creating a recording file using the sound signals corresponding to the sounds input through the microphones of the first earphone and the second earphone and create a separate recording file using the sound signal corresponding to the sound input through the microphone of the electronic device.

For example, in response to a determination that main sound sources of the sound signals corresponding to the sounds input through the microphones of the pair of earphones are identical and a difference between input gains of the main sound sources respective included in the sound signals is within a threshold gain, the electronic device may determine that the sound signals are identical or similar. In response to a determination that the main sound sources of the sound signals corresponding to the sounds input through the microphones of the pair of earphones are identical and the difference of the input gains of the main sound sources respectively included in the sound signals is greater than the threshold gain, the electronic device may determine that the sound signals are different. In response to a determination that the main sound sources of the sound signals corresponding to the sounds input through the microphones of the pair of earphones are different, the electronic device may determine that the sound signals are different. In addition, the electronic device may determine whether the sound signals corresponding to the sounds input through the microphones of the pair of earphones are identical or similar by comparing the sound signals based on secondary and tertiary sound sources corresponding to each of the sound signals or based on common pitch or prosody of the sound signals. Here, a main sound source is primary sound data included in a sound signal and may represent sound data obtained from a predetermined object around an earphone. For example, in response to different musical instruments having microphones installed being played together, primary and secondary sound sources of each of sound signals corresponding to a sound input through the microphones may intersect each other.

In operation 1222, in response to a determination that the sound signals corresponding to the sounds input through the microphones of the earphones are different, the electronic device may separately record the sound signals corresponding to the sounds input through the microphones of the earphones and the microphone of the electronic device instead of performing stereo recording. In other words, the electronic device may individually use the sound signals respectively corresponding to the sounds input through the microphone of the first earphone, the microphone of the second earphone, and the microphone of the electronic device to create three separate recording files.

According to an example embodiment, an electronic device may include: a communicator comprising communication circuitry configured to establish communication with a pair of earphones, and a processor configured to: determine whether each of the earphones is being worn and initiate recording of a sound input through a microphone of an earphone of the pair of earphones determined to be in a worn state.

In response to a change in a state of one earphone being sensed while recording is being performed, the processor may be configured to determine whether to record a sound input through a microphone of the earphone based on the changed state of the one earphone.

In response to the change in the state of the one earphone being sensed while recording is being performed, the processor may be configured to determine whether to record a sound input through a microphone of the electronic device based on receiving an input.

The processor may be configured to set at least one of the microphone of the electronic device and the microphones of the earphones as a microphone path used for the recording based on an input and record a sound input through the set microphone path.

The processor may be configured to display, on a display, a volume level of a sound signal corresponding to a sound input through a device used for the recording among the electronic device and the earphones and a microphone of the device used for the recording for each time point at which recording is performed.

The processor may be configured to: calculate a relative position of each of the earphones based on the electronic device, and synthesize sound signals corresponding to a plurality of sounds input through the microphone path based on the calculated relative position of each of the earphones.

The processor may be configured to display, on a display, an icon corresponding to the device used for the recording by placing the icon on a screen area determined based on the calculated relative position of each of the earphones.

The processor may be configured to: determine whether the earphones are being worn by the same user in response to a determination that the earphones are both in a worn state and individually record sound signals corresponding to sounds input through microphones of the earphones by entering an interview mode in response to a determination that the earphones are being worn by different users.

In response to the electronic device entering the interview mode, based on a sound signal corresponding to a sound input through a microphone of each of the earphones, the processor may be configured to: determine an earphone being worn by a speaker among the earphones, control an input gain of a microphone of the earphone being worn by the speaker to be greater than or equal to a first threshold value, and control an input gain of a microphone of an earphone other than the earphone being worn by the speaker between the earphones to be less than or equal to a second threshold value.

The processor may be configured to: determine whether a sound signal corresponding to a sound input through a microphone of an earphone determined to be in an unworn state among the earphones is significant and additionally record the sound signal in response to a determination that the sound signal is significant.

According to an example embodiment, a method performed by an electronic device may include: establishing communication with a pair of earphones, determining whether each of the earphones is being worn, and initiating recording of a sound input through a microphone of an earphone of the pair of earphones determined to be in a worn state.

According to an example embodiment, the method performed by the electronic device may further include, in response to a change in a state of one earphone being sensed while recording is being performed, determining whether to record a sound input through a microphone of the one earphone based on the changed state of the one earphone.

According to an example embodiment, the method performed by the electronic device may further include, in response to the change in the state of the one earphone being sensed while recording is being performed, determining whether to record a sound input through a microphone of the electronic device based on an input.

According to an example embodiment, the method performed by the electronic device may further include: setting the microphone of the electronic device or microphones of the earphones as a microphone path used for the recording based on an input and recording a sound input through the set microphone path.

According to an example embodiment, the method performed by the electronic device may further include: displaying, on a display, a volume level of a sound signal corresponding to a sound input through a device used for the recording among the electronic device and the earphones and a microphone of the device used for the recording for each time point at which recording is performed.

According to an example embodiment, the method performed by the electronic device may further include: calculating a relative position of each of the earphones based on the electronic device and synthesizing sound signals corresponding to a plurality of sounds input through a microphone path based on the calculated relative position of each of the earphones.

According to an example embodiment, the method performed by the electronic device may further include displaying, on a display, an icon corresponding to a device used for the recording by placing the icon on a screen area determined based on the calculated relative position of each of the earphones.

According to an example embodiment, the method performed by the electronic device may further include: determining whether the earphones are being worn by the same user in response to a determination that the earphones are both in a worn state and individually recording sound signals corresponding to sounds input through microphones of the earphones by entering an interview mode in response to a determination that the earphones are being worn by different users.

According to an example embodiment, the method performed by the electronic device may further include, in response to the electronic device entering the interview mode, based on a sound signal corresponding to a sound input through a microphone of each of the earphones; determining an earphone being worn by a speaker among the earphones, controlling an input gain of a microphone of the earphone being worn by the speaker to be greater than or equal to a first threshold value, and controlling an input gain of a microphone of an earphone other than the earphone worn by the speaker between the earphones to be less than or equal to a second threshold value.

According to an example embodiment, the method performed by the electronic device may further include: determining whether a sound signal corresponding to a sound input through a microphone of an earphone determined to be in an unworn state is significant and additionally recording the sound signal in response to a determination that the sound signal is significant.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
communication circuitry configured to establish communication with a pair of earphones;
a processor; and
memory storing instructions that, when executed by the processor, cause the electronic device to:
determine whether each of the earphones is being worn and initiate recording of a sound input through a microphone of an earphone determined to be in a worn state,
determine whether the earphones are being worn by a same user in response to a determination that the earphones are both in a worn state, and
record sound signals corresponding to sounds input through microphones of the earphones in response to a determination that the earphones are being worn by different users.

2. The electronic device of claim 1, wherein the processor is configured to, in response to a change in a state of one earphone being sensed while the recording is being performed, determine whether to record a sound input through a microphone of the one earphone based on a changed state of the one earphone.

3. The electronic device of claim 1, wherein the processor is configured to, in response to the change in the state of the one earphone being sensed while the recording is being performed, determine whether to record a sound input through a microphone of the electronic device based on an input.

4. The electronic device of claim 1, wherein the processor is configured to: set at least one of the microphone of the electronic device and the microphones of the earphones as a microphone path used for the recording based on an input and record a sound input through the set microphone path.

5. The electronic device of claim 1, wherein the processor is configured to display, on a display, a volume level of a sound signal corresponding to a sound input through a device used for the recording among the electronic device and the earphones and a microphone of the device used for the recording for each time point at which the recording is performed.

6. The electronic device of claim 1, wherein the processor is configured to: calculate a relative position of each of the earphones based on the electronic device and synthesize sound signals corresponding to a plurality of sounds input through a microphone path based on the calculated relative position of each of the earphones.

7. The method of claim 6, wherein the processor is configured to display, on a display, an icon corresponding to the device used for the recording by placing the icon on a screen area determined based on the calculated relative position of each of the earphones.

8. The electronic device of claim 1, wherein the processor is configured to: individually record sound signals corresponding to sounds input through microphones of the earphones by entering an interview mode in response to the determination that the earphones are being worn by different users.

9. The electronic device of claim 1, wherein the processor is configured to, in response to the electronic device entering the interview mode, based on a sound signal corresponding to a sound input through a microphone of each of the earphones, determine an earphone being worn by a speaker between the earphones, control an input gain of a microphone of the earphone being worn by the speaker to be greater than or equal to a first threshold value, and control an input gain of a microphone of an earphone other than the earphone being worn by the speaker between the earphones to be less than or equal to a second threshold value.

10. The electronic device of claim 1, wherein the processor is configured to determine whether a sound signal corresponding to a sound input through a microphone of an earphone determined to be in an unworn state is at least a specified value and additionally record the sound signal in response to a determination that the sound signal is at least the specified value.

11. A method performed by an electronic device, the method comprising:
establishing communication with a pair of earphones;
determining whether each of the earphones is being worn;
initiating recording of a sound input through a microphone of an earphone determined to be in a worn state among the earphones;
determining whether the earphones are being worn by a same user in response to a determination that the earphones are both in a worn state; and
recording sound signals corresponding to sounds input through microphones of the earphones in response to a determination that the earphones are being worn by different users.

12. The method of claim 11, further comprising:
in response to a change in a state of one earphone being sensed while the recording is being performed, determining whether to record a sound input through a microphone of the one earphone based on the changed state of the one earphone.

13. The method of claim 11, further comprising:
in response to a change in a state of the one earphone being sensed while the recording is being performed, determining whether to record a sound input through a microphone of the electronic device based on an input.

14. The method of claim 11, further comprising:
setting at least one of the microphone of the electronic device and the microphones of the earphones as a microphone path used for the recording based on an input; and
recording a sound input through the set microphone path.

15. The method of claim 11, further comprising:
displaying, on a display, a volume level of a sound signal corresponding to a sound input through a device used for the recording among the electronic device and the earphones and a microphone of the device used for the recording for each time point at which recording is performed.

16. The method of claim 11, further comprising:
calculating a relative position of each of the earphones based on the electronic device; and synthesizing sound signals corresponding to a plurality of sounds input through a microphone path based on the calculated relative position of each of the earphones.

17. The method of claim 11, further comprising:
displaying, on a display, an icon corresponding to a device used for the recording by placing the icon on a screen area determined based on a calculated relative position of each of the earphones.

18. The method of claim 11, further comprising:
individually recording sound signals corresponding to sounds input through microphones of the earphones by entering an interview mode in response to the determination that the earphones are being worn by different users.

19. The method of claim 11, further comprising:
in response to the electronic device entering the interview mode, based on a sound signal corresponding to a sound input through a microphone of each of the earphones, determining an earphone being worn by a speaker between the earphones, controlling an input gain of a microphone of the earphone being worn by the speaker to be greater than or equal to a first threshold value, and controlling an input gain of a microphone of an earphone other than the earphone being worn by the speaker between the earphones to be less than or equal to a second threshold value.

20. The method of claim 11, further comprising:
determining whether a sound signal corresponding to a sound input through a microphone of an earphone determined to be in an unworn state is at least a specified value; and
additionally recording the sound signal in response to a determination that the sound signal is at least the specified value.

* * * * *